(12) United States Patent
Weber et al.

(10) Patent No.: US 10,599,030 B2
(45) Date of Patent: Mar. 24, 2020

(54) IMAGING PLATE SCANNER

(71) Applicant: DUERR DENTAL AG, Bietigheim-Bissingen (DE)

(72) Inventors: Michael Weber, Burgstetten (DE); Bernd Philipps, Untergruppenbach (DE)

(73) Assignee: DUERR DENTAL AG, Bietigheim-Bassingen (DE)

( * ) Notice: Subject to any disclaimer, the term of this patent is extended or adjusted under 35 U.S.C. 154(b) by 0 days.

(21) Appl. No.: 15/561,610

(22) PCT Filed: Mar. 23, 2016

(86) PCT No.: PCT/EP2016/000508
§ 371 (c)(1),
(2) Date: Sep. 26, 2017

(87) PCT Pub. No.: WO2016/155874
PCT Pub. Date: Oct. 6, 2016

(65) Prior Publication Data
US 2018/0120689 A1  May 3, 2018

(30) Foreign Application Priority Data
Mar. 27, 2015  (DE) .................. 10 2015 003 902

(51) Int. Cl.
*G03B 42/08* (2006.01)
*G02B 27/02* (2006.01)

(52) U.S. Cl.
CPC ........... *G03B 42/08* (2013.01); *G02B 27/026* (2013.01)

(58) Field of Classification Search
CPC ... G01T 1/2014; G01T 1/2016; G02B 26/101; G02B 27/026; G03B 42/08
See application file for complete search history.

(56) References Cited

U.S. PATENT DOCUMENTS 4,527,060 A * 7/1985 Suzuki ................. H04N 1/4072
250/585
4,982,419 A * 1/1991 Horikawa ................ G21K 1/00
378/155

(Continued)

FOREIGN PATENT DOCUMENTS

DE     101 47 431 A1   1/2003
DE  10 2007 045 799 A1   4/2009

(Continued)

*Primary Examiner* — Marcus H Taningco
(74) *Attorney, Agent, or Firm* — Schroeder Intellectual Property Law Group, LLC

(57) ABSTRACT

A device for reading out an exposed imaging plate, having a light source producing a read-out light, a deflecting unit sequentially directing the read-out light at the imaging plate with a read-out spot in order to read out the imaging plate, whereby a traveling read-out spot can be produced there, a detector unit for fluorescent light, which is emitted by the imaging plate during the reading out by means of the read-out light, and a control device for controlling the light source, the deflecting unit, and the detector unit. The control device performs a preliminary read-out of the imaging plate in order to determine read-out parameters and to subsequently read out the imaging plates using the determined read-out parameters. A method for reading out an imaging plate reading out part of the information on the imaging plate surface, determining read-out parameters on the basis of the read-out part of the information, and reading out the remaining part of the information of the imaging plate surface using the read-out parameters.

14 Claims, 2 Drawing Sheets

(56) References Cited

U.S. PATENT DOCUMENTS

| | | | |
|---|---|---|---|
| 5,099,119 A * | 3/1992 | Horikawa | G03B 42/02 |
| | | | 250/589 |
| 5,157,733 A | 10/1992 | Takeo et al. | |
| 5,198,669 A * | 3/1993 | Namiki | G06T 5/009 |
| | | | 250/587 |
| 5,376,806 A | 12/1994 | Hejazi | |
| 5,583,346 A | 12/1996 | Nakajima | |
| 5,592,374 A | 1/1997 | Fellegara et al. | |
| 5,596,654 A | 1/1997 | Tanaka | |
| 6,376,856 B1 | 4/2002 | Katagiri | |
| 9,613,429 B2 * | 4/2017 | Ito | G06T 7/20 |
| 2006/0180778 A1 | 8/2006 | Fasbender et al. | |
| 2009/0078874 A1 | 3/2009 | Schweizer et al. | |
| 2009/0097617 A1 | 4/2009 | Kruger | |
| 2009/0190191 A1 | 7/2009 | Rosenstock et al. | |
| 2012/0256100 A1 | 10/2012 | Haentsch et al. | |
| 2014/0252252 A1 | 9/2014 | Philipps et al. | |
| 2017/0018078 A1 * | 1/2017 | Liu | G06K 9/6209 |

FOREIGN PATENT DOCUMENTS

| | | | |
|---|---|---|---|
| DE | 10 2011 016 601 A1 | 10/2012 | |
| DE | 20 2011 105 920 U1 | 3/2013 | |
| DE | 20 2012 012 948 U1 | 9/2014 | |
| JP | S61-236887 | 10/1986 | |
| JP | S63-262141 | 10/1988 | |
| JP | H4-102842 | 4/1992 | |
| JP | H4-156534 | 5/1992 | |
| JP | H8-263648 | 10/1996 | |
| WO | WO-9315436 A1 * | 8/1993 | G03B 42/02 |

* cited by examiner

IMAGING PLATE SCANNER

RELATED APPLICATIONS

This application is a national phase of International Patent Application No. PCT/EP2016/000508 filed Mar. 23, 2016, which claims the filing benefit of German Patent Application No. 10 2015 003 902.4 filed Mar. 27, 2015, the contents of both of which are incorporated herein by reference.

FIELD OF THE INVENTION

The invention relates to an apparatus for reading an exposed imaging plate.

BACKGROUND OF THE INVENTION

These days, imaging plates are used for recording x-ray images within the scope of x-ray technology, in particular dental x-ray technology. These imaging plates comprise a phosphor material which is embedded in a transparent matrix. As a result, so-called storage centers arise, which can be converted by incident x-rays into excited metastable states. If such an imaging plate is exposed within an x-ray installation, for example for recording a bitewing of a patient, the imaging plate obtains a latent x-ray image in the form of excited and non-excited storage centers.

For the purposes of reading the imaging plate, the latter is scanned point-by-point with readout light in a scanning apparatus, as a result of which the metastable states of the excited storage centers are brought into a state which quickly relaxes under the emission of fluorescence light. This fluorescence light can be captured with the aid of a detector unit such that the x-ray image can be made visible using appropriate evaluation electronics.

Conventional scanning apparatuses, such as e.g. a drum scanner, guide the imaging plate along a cylindrical area over a readout gap. In the interior of the cylinder area, a rotating mirror is provided as a deflection unit, said rotating mirror producing a circulating readout beam. This readout beam passes through the readout gap onto the imaging plate and reads the latter point-by-point. At the same time, the imaging plate is guided past the readout gap by way of a mechanical drive such that the entire area of the imaging plate is captured.

Usually, the imaging plate is read with preset or structurally predetermined fixed readout parameters. Readout parameters include, for example, the dimension of the readout spot, i.e., for example, the focal dimension, on the imaging plate, the laser intensity of the excitation laser, gain, sensitivity and characteristic of the image receiver, and the integration time per pixel. A consequence of this is that an ideal image quality cannot be obtained in the case of strongly changing recording conditions. By way of example, it is not possible to react to an overexposure or underexposure of an imaging plate or to a large dynamic range within the image situated on an imaging plate. One possible remedy lies in correcting the read image by way of subsequent image processing. However, this may lead to increased image noise or image artifacts under certain circumstances. Alternatively, the entire dynamic range of the system can be increased. However, this is often not realizable from an economical or technical point of view.

SUMMARY OF THE INVENTION

The invention is based on an object of specifying an apparatus and a method for reading an exposed imaging plate, which at least reduce the aforementioned disadvantages and which, in particular, facilitate a readout with ideal readout parameters of the image situated on the imaging plate.

This object may be achieved by an apparatus for reading an exposed imaging plate having a light source, by means of which readout light is producible, a deflection unit, by means of which the readout light can be directed sequentially at the imaging plate with a readout spot for the purposes of reading the imaging plate, as a result of which a traveling readout spot is producible there, a detector unit for fluorescence light that is emitted by the imaging plate during the readout by the readout light, a control device that is configured to control the light source, the deflection unit, and the detector unit, wherein the control device is configured to effectuate reading of the imaging plate in advance for the purposes of ascertaining readout parameters and subsequently effectuate a readout of the imaging plate using the ascertained readout parameters. Further configurations of the apparatus are specified in additional aspects of the invention. Moreover, the object may be achieved by a method for reading an imaging plate reading some of the information that is situated on the imaging plate, ascertaining readout parameters on the basis of the read portion of the information, and reading the remaining part of the information on the imaging plate with the readout parameters. Further configurations of the method are specified in additional aspects of the invention.

The apparatus according to the invention for reading an exposed imaging plate comprises a light source, by means of which readout light is producible. By way of example, the light source can be a laser light source. The apparatus further comprises a deflection unit, by means of which the readout light can be directed sequentially at the imaging plate with a specific readout spot for the purposes of reading the imaging plate. Here, a readout excitation power per unit area of the imaging plate is produced. By way of example, the deflection unit may comprise a controllable mirror for deflecting the readout light. The mirror can be a rotating deflection mirror of the type set forth at the outset. Alternatively, the apparatus may comprise an imaging plate that is stationary during the readout process and a movable mirror such as e.g. a micromirror.

Moreover, in the apparatus, provision is made of a detector unit for fluorescence light that is emitted by the imaging plate during the readout by the readout light and of a control device that is configured to control the light source, the deflection unit, and the detector unit.

According to the invention provision is made in the apparatus for the control device to be configured to effectuate reading of the imaging plate for the purposes of ascertaining readout parameters and subsequently effectuate a readout of the imaging plate using the ascertained readout parameters. The advance readout process carried out before the actual readout process can serve, for example, to determine the exposure state of the imaging plate. This facilitates ascertaining optimized readout parameters for the subsequent actual readout process.

Preferably, provision is made for the advance readout to be effectuated with advance readout parameters that differ from the readout parameters. Hence, advance readout parameters which, for example, are particularly suitable for ascertaining the exposure state of the imaging plate and, at the same time, impair the information stored on the imaging plate as little as possible can be used for the advance readout process.

It may be advantageous if provision is made for the readout parameters to comprise a power output of the light source, an excitation power per unit area of the imaging plate, a spot dimension, an integration time, a detector unit gain, a detector unit sensitivity, a detector unit characteristic, a spatial readout scheme, and/or a temporal readout scheme. Varying one of these readout parameters, a combination of the aforementioned readout parameters or all of the readout parameters may be suitable for suitably designing the advance readout process. At the same time, one of these readout parameters, a combination of the aforementioned readout parameters or all of the readout parameters can be varied, and hence optimized, depending on the information ascertained during the advance readout.

In a possible configuration of the apparatus according to the invention, provision can be made for the control device to be configured to determine an advance readout excitation power per unit area of the imaging plate for the advance readout, with the advance readout excitation power being lower than the readout excitation power. Thus, the readout light impinging on the imaging plate is set to be lower in terms of its readout excitation power per unit area of the imaging plate, in particular by a factor of between 2 and 100, preferably by a factor of between 10 and 50, particularly preferably by a factor of 10, than during the actual readout process. For the advance readout, the advance readout excitation power per unit area of the imaging plate should be set in such a way that fluorescence light can be emitted again during a subsequent readout process.

In the subsequent readout process, the ascertained values can be corrected on the basis of the already known advance readout points to the effect that the fluorescence light values that are read during the advance readout are added to the fluorescence light values ascertained during the actual readout. Alternatively, the values ascertained at an imaging plate location during the advance readout can be discarded and an interpolation can be carried out on the basis of neighboring locations.

In this context, provision can be made for the advance readout excitation power per unit area of the imaging plate to be producible by an advance readout power output of the light source that is smaller than the readout power output of the light source. Thus, according to the invention, provision can be made for the continuous wave or pulsed power output of the excitation laser to be reduced.

Additionally, or alternatively, provision can be made in an advantageous embodiment for the advance readout excitation power per unit area of the imaging plate to be producible by an advance readout spot dimension that is smaller or larger than the readout spot dimension. Two alternatives are available here. In accordance with the first alternative, the advance readout spot dimension is kept small. Hence, only a spot dimension that is small in comparison with the overall imaging plate area is used for the advance readout process. In particular, the advance readout spot dimension can be chosen to be smaller than during the actual readout process. Alternatively, the readout spot dimension can be designed to be substantially larger. In the case of an unchanging advance readout intensity of the readout light, this reduces the excitation power per unit area of the imaging plate and per unit time, and leads to an averaging over a relatively large region of the imaging plate area. Preferably, the advance readout spot dimension can be chosen to be at least one order of magnitude larger than the readout spot dimension.

Moreover, provision can be made additionally or alternatively in one embodiment for the advance readout excitation power per unit area of the imaging plate to be determined by an advance readout period of time that is shorter than the readout period of time. The readout period of time can be the period of time that is required for reading a single readout point, i.e., for example, an integration time. However, the readout period of time can also be the time that is required overall for reading the entire imaging plate area. By way of reducing the period of time required for the readout, it is possible to obtain a partial information item of the image situated on the imaging plate, said partial information item being sufficient for ascertaining the readout parameters.

It may be advantageous if the advance readout comprises reading out a number of advance readout points, the number of which is smaller than the overall number of readout points. Thus, alternatively or additionally, only a certain number of readout points can be read for the advance readout process in addition to reducing the excitation power per unit area of the imaging plate, for example by reducing the readout power output, by a reduced or increased readout spot dimension or by a reduced readout duration. During a subsequent readout, the already known advance readout points can be corrected or interpolated on the basis of the actual readout points.

In this context, provision can be made for the advance readout points to be distributed over the imaging plates. The distribution can anticipate a certain expected image design in this case. Alternatively, or additionally, the advance readout points can be arranged in the form of lines or columns. By way of example, this arrangement can be matched to the configuration of the readout installation.

Advantageously, the control device can be configured to carry out the advance readout with a higher readout speed. In the present case, the readout speed should be understood to mean the relative movement between the readout light and the imaging plate. Thus, firstly, the readout light can be moved more quickly over the imaging plates or, alternatively, the imaging plate can be moved more quickly relative to the readout installation. In both cases, the increased readout speed leads to a partial readout of the image contained in the imaging plate.

Independently of the explained solution approaches, the optimization of the readout parameters can be applied over the whole area for the entire imaging plate area or, with a spatially dependent resolution, for specific regions of the imaging plates in accordance with the results of the advance readout found there.

The method according to the invention for reading an imaging plate comprises the following steps:
reading some of the information that is situated on the imaging plate; ascertaining readout parameters on the basis of the read portion of the information; and reading the remaining part of the information on the imaging plate with the readout parameters.

The step of reading some of the information that is situated on the imaging plate can employ one of the readout methods described above. Some of the information may relate to a part of an image that is situated on the imaging plate, in particular to a spatially delimited portion of the image such as individual points, lines or columns. However, the part of the image can also be a readout that is effectuated over the entire imaging plate area, said readout, for example, being obtained on the basis of a power output that is chosen to be lower or on the basis of switching the readout light on and off in a time-controlled fashion. Further, this may also relate to additional information that is situated on the imaging plate.

In a preferred configuration of the method, provision can be made for the readout of some of the information to be effectuated with advance readout parameters that differ from the readout parameters.

Further, provision may advantageously be made for ascertaining the readout parameters to comprise ascertaining the exposure of the imaging plate on the basis of the read portion of the information and adapting the readout parameters on the basis of an ascertained exposure. The readout parameters can be optimized and the image that remains on the imaging plate can be read out in an ideal manner on account of the exposure that is established over a certain region or over the entire imaging plate area.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Now, the invention is explained in more detail on the basis of an exemplary embodiment, with reference being made to the drawings. In the drawings.

DETAILED DESCRIPTION OF THE PRESENT INVENTION

Figure 1:
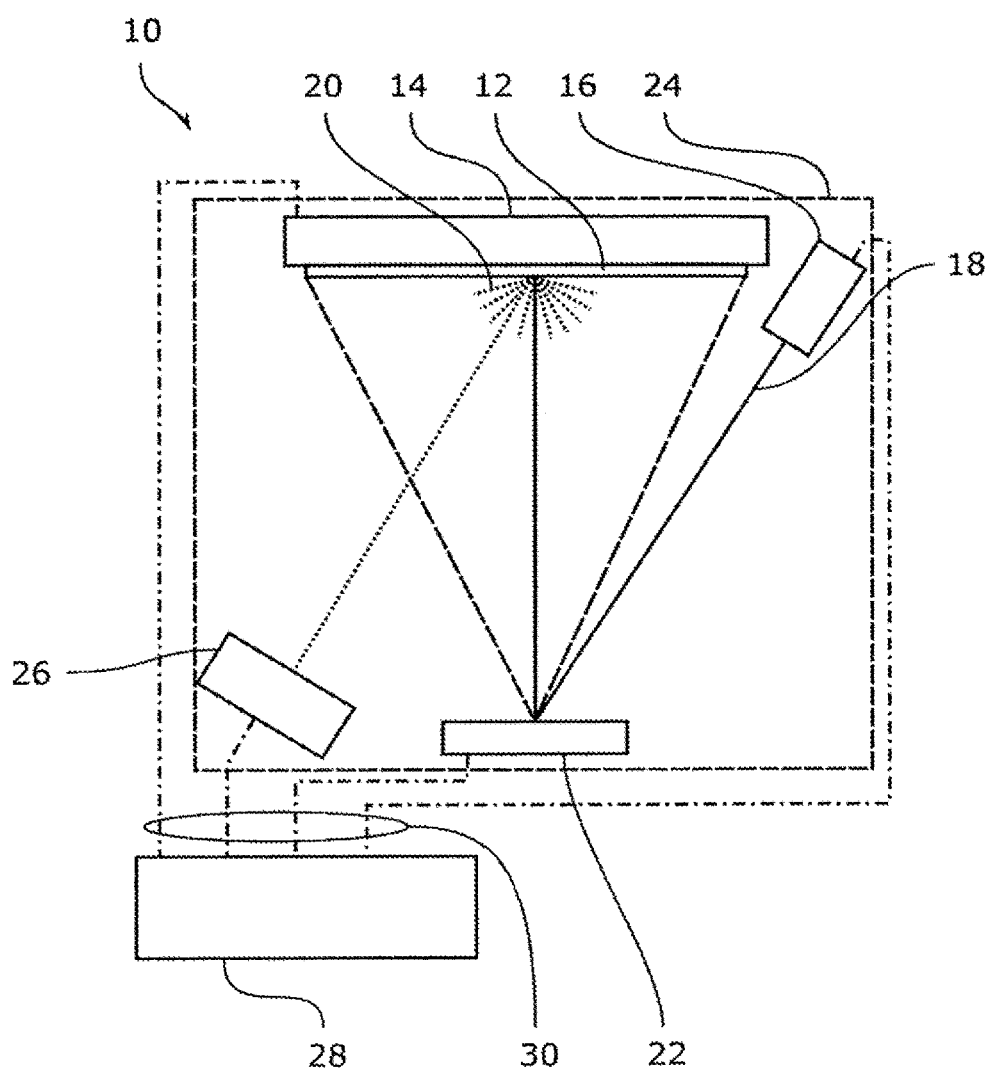
FIG. 1 shows a schematic illustration of a scanning apparatus for reading imaging plates in accordance with an exemplary embodiment.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

FIG. 1 shows a scanning apparatus 10 for reading an imaging plate 12, which carries a latent x-ray image in the form of metastable storage centers that were excited by x-ray radiation.

The scanning apparatus 10 comprises a support apparatus 14 for the imaging plate 12. By way of example, the imaging plate 12 can be fastened on the support apparatus 14 by means of negative pressure in such a way that the imaging plate 12, which is generally flexible, nestles in a planar manner against the support area 14.

The scanning apparatus 10 further comprises a laser 16 as a readout light source, said laser producing a readout light beam 18 with a wavelength lying in the red, by means of which the metastable storage centers of the imaging plate 12 are able to be excited to fluorescence. This fluorescence light 20 typically lies in the blue.

In the present embodiment of the scanning apparatus 10, the laser 16 is arranged in such a way that it directs the readout light beam 18 onto a controllable deflection unit. In the present case, the controllable deflection unit is embodied as a mirror 22. However, other deflection units other than mirrors, such as e.g. optical units or the like, are also conceivable. The mirror 22 can be embodied as a micromirror, in particular as a MEMS component, and thus facilitate scanning of the area of the imaging plate 12 without or with only little relative movement between the mirror 22 and the support apparatus 14. Alternatively, the mirror 22 can also be provided conventionally as a rotating mirror for a drum scanner. In this case, a relative movement between the support apparatus 14 and the mirror 22 is realized by means of a transport apparatus (not depicted here).

The scanning apparatus 10 may further comprise a reflector 24, which is indicated using dashed lines in the drawing and which surrounds the entire measurement chamber around the imaging plate 12 in a light-tight manner such that the fluorescence light 20 emanating from the imaging plate 12 is reflected to a photodetector 26. In order to prevent the scattered readout light 18 from reaching the photodetector 26, provision can be made of suitable measures such as e.g. a dichroic filter material.

For the purposes of controlling the readout process, the scanning apparatus 10 comprises a control unit 28 which, for example, can also assume evaluation or correction functions in addition to the control function. However, the control unit 28 itself or the evaluation and/or correction functions may also be implemented on a separate computer. The control unit 28 is connected to the support apparatus 14, the detector 26, the laser 16, and the mirror 22 by means of lines 30.

For readout purposes, the control unit 28 actuates the laser 16 and the mirror 22 and scans the imaging plate 12 point-by-point in sequence with the readout light beam 18. Here, the intensity of the emitted fluorescence light 20 is captured with the aid of the photodetector 26 and prepared in the control unit 28 for output purposes.

Before the actual readout of the image that is stored on the imaging plate 12, an advance readout is effectuated, as just described above, in a manner depending on the construction of the scanning apparatus 10. In the described scanning apparatus 10, which is equipped with a controllable mirror 22 such as e.g. a MEMS mirror, it would be possible to effectuate a point-by-point predetermination of the imaging plate 12. By contrast, in the case of a conventional drum structure, it is alternatively possible, for example, to effectuate a line-by-line predetermination of the exposure of the image that is stored on the imaging plate 12, using a reduced laser power of the readout laser beam 18 at an increased transport speed of the imaging plate 12. A predetermination that is effectuated both point-by-point and line-by-line provides indications about an exposure of the imaging plate 12. The subsequent actual readout scan then can be effectuated with optimized scanning parameters. In the case of a drum scanner construction, the imaging plate 12 could be supplied to the scanning apparatus 10 a second time for the actual readout process, or it could be conveyed backward by way of the transport apparatus.

Figure 2:
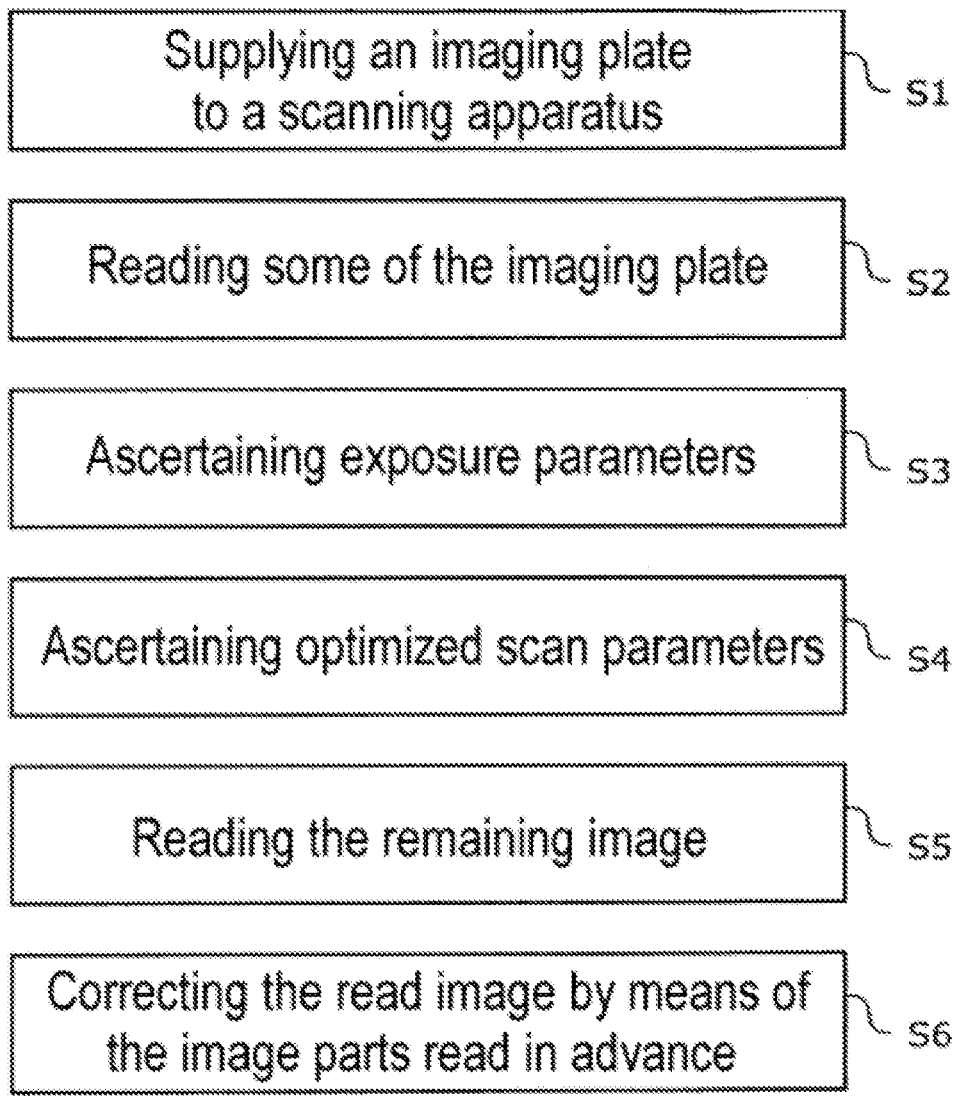
FIG. 2 shows a schematic flowchart of a method in accordance with an exemplary embodiment.

FIG. 2 elucidates a method according to the invention for reading an imaging plate.

In a first step, an imaging plate is supplied to a scanning apparatus for the purposes of reading the imaging plate (S1).

Some of the information present on the imaging plate is read by means of the scanning apparatus (S2). The part of the imaging plate can be e.g. individual pixels that are distributed over the imaging plate area, correspondingly distributed pixel clusters, lines that are line-shaped or column-shaped, delimited imaging plate areas and/or the entire imaging plate image. The readout can be effectuated with a reduced readout light intensity, with a higher readout speed, with an enlarged readout spot, with a light characteristic that differs from the readout light, for example in terms of polarization or wavelength, and/or any combination of the aforementioned properties.

The exposure of the image is deduced from the read image information (S3). Here, it is possible to consider e.g. ascertained image intensities, minimum-maximum differences, contrast ratios, etc.

The scanning parameters for the actual readout process are optimized by means of the ascertained exposure parameters (S4). The parameters to be optimized can be e.g. the focus or spot dimension, the laser power of the excitation laser, the gain, the sensitivity and/or the characteristic of the image receiver such as e.g. a photomultiplier, and/or the integration time per pixel.

The remaining remainder of the image is read by means of the optimized scanning parameters established thus (S5).

After reading out the actual image (S5), it is possible to carry out a correction (S6) of the read image on the basis of the image parts read in advance (S2). Here, the points that were read in advance and should no longer be read out can be interpolated or, if emissions have still occurred at the points that were already read out in advance, said points can be corrected.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

We claim:

1. An apparatus for reading an exposed imaging plate, comprising:
    a light source, by means of which readout light is producible,
    a deflection unit, by means of which the readout light can be directed sequentially at an imaging plate with a readout spot for the purposes of reading the imaging plate, as a result of which a traveling readout spot is producible there,
    a detector unit for fluorescence light that is emitted by the imaging plate during the readout by the readout light,
    a control device that is configured to control the light source, the deflection unit, and the detector unit,
    wherein
    the control device is configured to effectuate an advanced readout of the imaging plate for the purposes of ascertaining readout parameters, wherein the advanced readout comprises reading out a number of advance readout points, the advance readout points being distributed throughout the imaging plate, and
    subsequently effectuate a readout of a remaining portion of the imaging plate using the ascertained readout parameters, wherein the remaining portion of the imaging plate is an area of the imaging plate different than the advance readout points.

2. The apparatus as claimed in claim 1, wherein the advance readout is effectuated with advance readout parameters that differ from the readout parameters.

3. The apparatus as claimed in claim 1, wherein the readout parameters comprise a luminous power of the light source, an excitation power per unit area of the imaging plate, a spot dimension, an integration time, a detector unit gain, a detector unit sensitivity, a detector unit characteristic, a spatial readout scheme, and/or a temporal readout scheme.

4. The apparatus as claimed in claim 1 wherein the control device is configured to effectuate the advance readout with an advance readout excitation power per unit area of the imaging plate that is lower than a readout excitation power per unit area of the imaging plate.

5. The apparatus as claimed in claim 4, wherein the advance readout excitation power per unit area of the imaging plate is producible by an advance readout luminous power of the light source that is smaller than the readout luminous power of the light source.

6. The apparatus as claimed in claim 4, wherein the advance readout excitation power per unit area of the imaging plate is producible by an advance readout spot dimension that is smaller or larger than the readout spot dimension.

7. The apparatus as claimed in claim 6, wherein the advance readout spot dimension is at least one order of magnitude larger than the readout spot dimension.

8. The apparatus as claimed in claim 4, wherein the advance readout excitation power is determined by an advance readout period of time that is shorter than the readout period of time.

9. The apparatus as claimed in claim 1, wherein the control device is configured to carry out the advance readout with a higher readout speed.

10. The apparatus as claimed in claim 1, wherein the ascertained readout parameters for a first region of the area of the imaging plate containing the remaining information are different than the ascertained readout parameters for a second region of the area of the imaging plate containing the remaining information.

11. A method for reading an imaging plate, comprising the following steps:
    reading a number of advance readout points of information situated on an imaging plate, the advance readout points being distributed throughout the imaging plate;
    ascertaining readout parameters on the basis of the advance readout points; and
    reading a remaining portion of information on the imaging plate with the readout parameters, the remaining portion of information being in an area on the imaging plate different than the advance readout points.

12. The method as claimed in claim 11, wherein the readout of some of the information is effectuated with advance readout parameters that differ from the readout parameters.

13. The method as claimed in claim 11, wherein ascertaining the readout parameters comprises ascertaining the exposure of the imaging plate on the basis of the read portion of the information and adapting the readout parameters on the basis of an ascertained exposure.

14. The method as claimed in claim 11, further comprising the step of ascertaining a second set of readout parameters using a portion of the advance readout points, the second set of readout parameters being different than the readout parameters, wherein the readout parameters are used to read a first region of the area of the imaging plate containing the remaining information and the second set of readout parameters are used to read a second region of the area of the imaging plate containing the remaining information.

* * * * *